United States Patent
Guo et al.

(10) Patent No.: US 11,662,476 B2
(45) Date of Patent: May 30, 2023

(54) APPARATUS AND METHOD OF CALCULATING POSITION-VELOCITY-TIME RESULTS OF RECEIVER

(71) Applicant: Beken Corporation, Shanghai (CN)

(72) Inventors: Dawei Guo, Shanghai (CN); Pengfei Zhang, Shanghai (CN)

(73) Assignee: Beken Corporation, Shanghai (CN)

( * ) Notice: Subject to any disclaimer, the term of this patent is extended or adjusted under 35 U.S.C. 154(b) by 16 days.

(21) Appl. No.: 17/379,958

(22) Filed: Jul. 19, 2021

(65) Prior Publication Data

US 2023/0003906 A1 Jan. 5, 2023

(30) Foreign Application Priority Data

Jun. 30, 2021 (CN) .......................... 202110738240.1

(51) Int. Cl.
  *G01S 19/42* (2010.01)
  *G01S 19/52* (2010.01)
  (Continued)

(52) U.S. Cl.
  CPC .............. *G01S 19/42* (2013.01); *G01S 19/40* (2013.01); *G01S 19/52* (2013.01); *G01S 19/44* (2013.01)

(58) Field of Classification Search
  CPC .......... G01S 19/42; G01S 19/40; G01S 19/44; G01S 19/52
  (Continued)

(56) References Cited

U.S. PATENT DOCUMENTS

| 6,664,923 | B1 * | 12/2003 | Ford | G01S 19/47 342/357.65 |
| 8,339,310 | B2 * | 12/2012 | Mizuochi | G01S 19/48 342/357.23 |

(Continued)

FOREIGN PATENT DOCUMENTS

| CN | 101609140 B | * | 7/2011 | ............... G01S 5/02 |
| CN | 105044737 A | * | 11/2015 | ............. G01S 19/23 |

(Continued)

OTHER PUBLICATIONS

"Principles of GPS and Receiver Design", Chapter 6.3.4; Editors Xie, Gang; Publishing House of Electronics Industry, (Jul. 2009), 12 pgs.

(Continued)

*Primary Examiner* — Chuong P Nguyen
(74) *Attorney, Agent, or Firm* — Schwegman Lundberg & Woessner, P.A.

(57) ABSTRACT

A PVT calculation device includes a memory; and one or more processors in communication with the memory configured to perform operations including: receiving observations and ephemerides from satellites to obtain PVT data of the satellites and predicted PVT results of the receiver; setting up observation functions respectively corresponding to the satellites; calculating by a least square solution first estimated PVT results of the receiver based on the observation functions; iteratively eliminating by a Random-Sampling Iterative Kalman Filter (RSIKF) algorithm fault observation functions from the observation functions in an inner cluster until no fault observation functions detected in the inner cluster; calculating by the RSIKF algorithm a second estimated PVT results of the receiver using the observation functions in the inner cluster; and outputting final estimated PVT results of the receiver. The PVT calculation device may (Continued)

calculate the PVT results of the receiver with improved accuracy and stability.

20 Claims, 5 Drawing Sheets

(51) Int. Cl.
*G01S 19/40* (2010.01)
*G01S 19/44* (2010.01)

(58) Field of Classification Search
USPC ............. 342/357.25, 357.23, 357.35, 357.27
See application file for complete search history.

(56) References Cited

U.S. PATENT DOCUMENTS 10,908,294 B2 * 2/2021 Lyusin .................. G01S 19/215
10,942,281 B2 * 3/2021 Laurichesse ............ G01S 19/47
10,969,496 B2 * 4/2021 Martin .................. G01S 19/256
2021/0223405 A1 * 7/2021 Mu .......................... G01S 19/06

FOREIGN PATENT DOCUMENTS

| CN | 114594504 A | * | 6/2022 | ............. G01S 19/37 |
|---|---|---|---|---|
| EP | 3124998 A1 | * | 2/2017 | ............. G01S 19/22 |
| WO | WO-2021238994 A1 | * | 12/2021 | ............. G01S 19/42 |

OTHER PUBLICATIONS

Da, Ren, "Failure Detection of Dynamical Systems with the State Chi-Square Test", Journal of Guidance, Control and Dynamics, vol. 17, No. 2, (May 23, 2012), 271-277.

Zekavat, Seyed A., et al., "Handbook of Position Location: Theory, Practice, and Advances", Editors Seyed A (Reza) Zekavat and R. Michael Buehrer; Published by John Wiley & Sons, Inc., (2011), 1255 pgs.

* cited by examiner

APPARATUS AND METHOD OF CALCULATING POSITION-VELOCITY-TIME RESULTS OF RECEIVER

CROSS REFERENCE TO RELATED APPLICATION

This application claims priority to and incorporates by reference Chinese patent application number 202110738240.1 filed Jun. 30, 2021.

TECHNICAL FIELD

The present application relates to an apparatus and a method of calculating positioning results of a Global Navigation Satellite System (GNSS) receiver, and more particularly an apparatus and a method of calculating Position-Velocity-Time (PVT) results of a GNSS receiver.

BACKGROUND

Typically, a GNSS receiver may obtain data from GNSS satellites (such as Beidou III satellites), and may calculate positioning results of the receiver based on the data. However, under some circumstances, for example, when the receiver is travelling along a path significantly affected by multipath delays, the calculated positioning results of the receiver may likely suffer inaccuracy and instability. Thus, an improved way of calculating the positioning results of the receiver with increased accuracy and stability is required.

BRIEF DESCRIPTION

According to an embodiment, a PVT calculation device comprises: a memory; and one or more processors in communication with the memory, the one or more processors configured to perform operations including: receiving observations and ephemerides from satellites to obtain PVT data of the satellites and predicted PVT results of the receiver; setting up observation functions respectively corresponding to the satellites, based on the PVT data of the satellites and the predicted PVT results of the receiver; calculating by a least square solution first estimated PVT results of the receiver based on the observation functions; iteratively eliminating by a Random-Sampling Iterative Kalman Filter (RSIKF) algorithm fault observation functions from the observation functions in an inner cluster until no fault observation functions detected in the inner cluster; calculating by the RSIKF algorithm second estimated PVT results of the receiver using the observation functions in the inner cluster; and outputting final estimated PVT results of the receiver.

According to an embodiment, a method of calculating PVT results of a receiver using a PVT calculation device (200) comprises: receiving observations and ephemerides from satellites to obtain PVT data of the satellites and predicted PVT results of the receiver; setting up observation functions respectively corresponding to the satellites, based on the PVT data of the satellites and the predicted PVT results of the receiver; calculating, by a least square solution, first estimated PVT results of the receiver based on the observation functions; iteratively eliminating, by a Random-Sampling Iterative Kalman Filter (RSIKF) algorithm, fault observation functions from the observation functions in an inner cluster until no fault observation functions detected in the inner cluster; calculating, by the RSIKF algorithm, second estimated PVT results of the receiver using the observation functions in the inner cluster; and outputting final estimated PVT results of the receiver.

According to an embodiment, a non-transitory computer-readable medium storing instructions that, when executed by one or more computer processors of a PVT calculation device, cause the PVT calculation device to perform operations comprising: receiving observations and ephemerides from satellites to obtain PVT data of the satellites and predicted PVT results of the receiver; setting up observation functions respectively corresponding to the satellites, based on the PVT data of the satellites and the predicted PVT results of the receiver; calculating by a least square solution first estimated PVT results of the receiver based on the observation functions; iteratively eliminating by a Random-Sampling Iterative Kalman Filter (RSIKF) algorithm fault observation functions from the observation functions in an inner cluster until no fault observation functions detected in the inner cluster; calculating by the RSIKF algorithm a second estimated PVT results of the receiver using the observation functions in the inner cluster; and outputting final estimated PVT results of the receiver.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking an apparatus and a method of calculating Position-Velocity-Time (PVT) results of a GNSS receiver as example. Those of ordinary skills in the art understand that this is only to describe the application clearly and adequately, rather than limit the scope of the application, which is defined by the appended claims.

The GNSS receiver may receive Radio Frequency (RF) signals from navigational satellites, may obtain data (such as original observations and ephemerides) from the satellites, and then may use a Kalman filter to calculate positioning results (such as PVT results) of the receiver based on the original observations and ephemerides for example. However, under some circumstances, for example, when the receiver carried by a vehicle is travelling along a path that is significantly affected by multipath delays (e.g., caused by urban high-rises, over-crosses, and canyons), the calculated PVT results of the receiver may likely suffer inaccuracy and instability.

Figure 1:
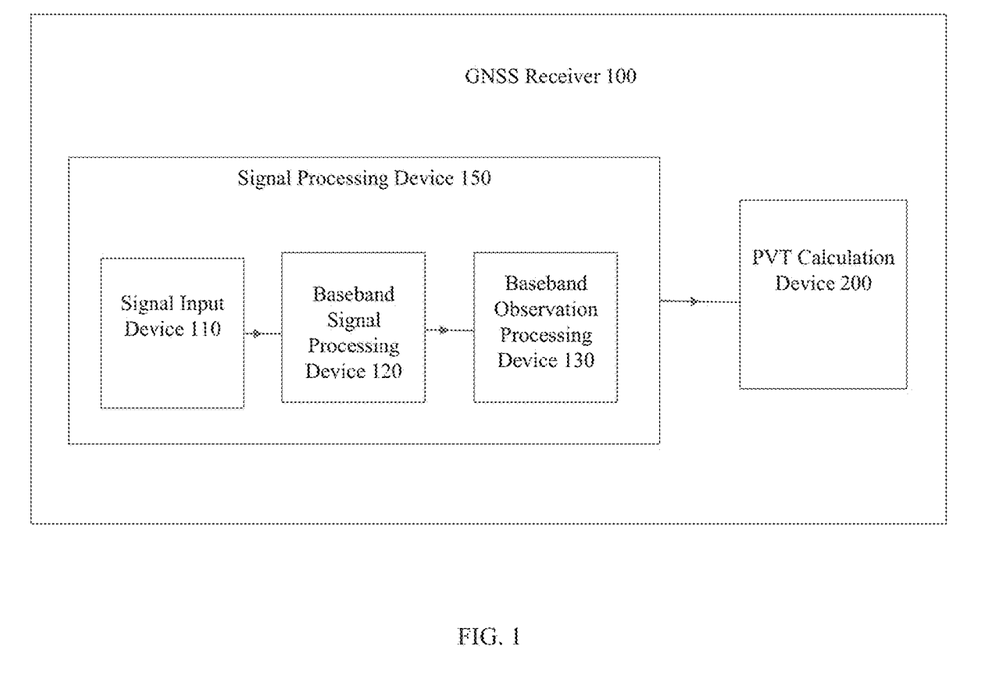
FIG. 1 is a diagram illustrating a GNSS receiver (100) according to an embodiment.

FIG. 1 is a diagram illustrating a GNSS receiver (100) according to an embodiment. The GNSS receiver (100) may include a signal processing device (150) and a PVT calculation device (200). The signal processing device (150) may include a signal input device (110), a baseband signal processing device (120), and a baseband observation processing device (130) coupled in series. According to an embodiment, the signal processing device (150) may receive and process RF navigation signals from GNSS satellites, and may output observations and ephemerides respectively corresponding to the satellites.

Figure 2:
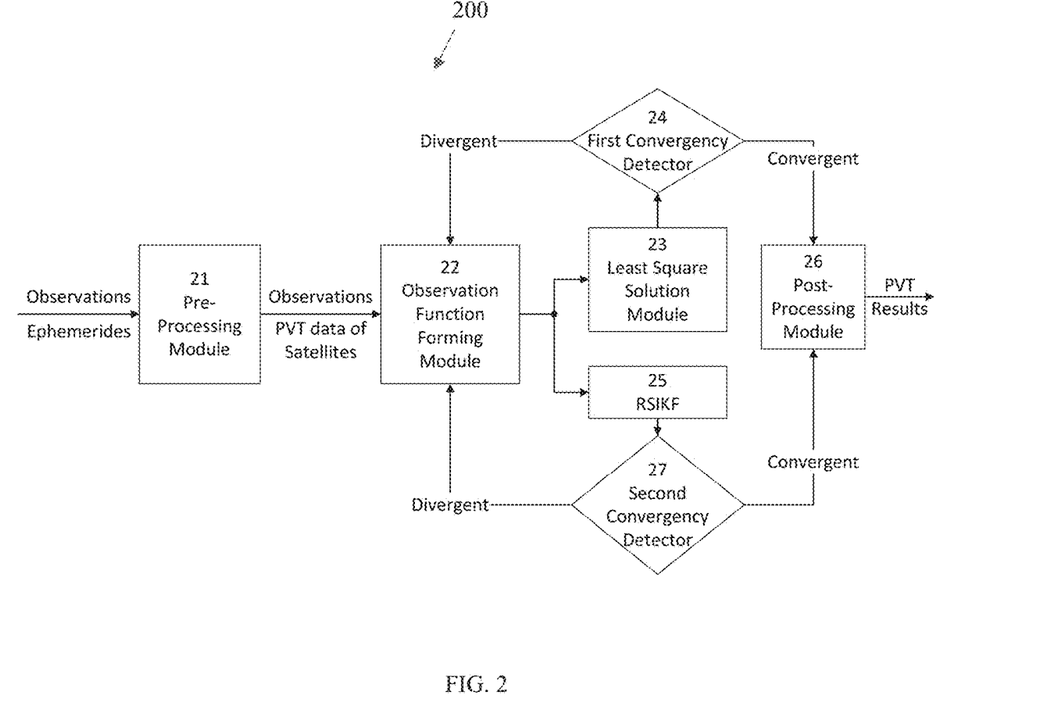
FIG. 2 is a diagram illustrating a PVT calculation device (200) in the GNSS receiver (100) according to an embodiment.

FIG. 2 is a diagram illustrating the PVT calculation device (200) in the GNSS receiver (100) according to an embodiment. The PVT calculation device (200) may include a pre-processing module (21), an observation function forming module (22) coupled to the pre-processing module (21), a least square solution module (23) coupled to the observation function forming module (22) and a first convergence detector (24), a Random-Sampling Iterative Kalman filter (RSIKF) (25) coupled to the observation function forming module (22) and a second convergence detector (27), and a post-processing module (26) coupled to the least square solution module (23) and the RSIKF (25).

The pre-processing module (21) may receive observations and ephemerides, may obtain positioning data (such as PVT data) of the satellites, and may obtain predicted PVT results of the receiver (100).

The pre-processing module (21) may coarsely screens the observations and the ephemerides based on gross error detections of raw measurements of the observations and ephemeris validity detections of the ephemerides to obtain valid observations and ephemerides. For example, the pre-processing module (21) receives 20 observations and ephemerides from 20 satellites, screens out 2 invalid observations and ephemerides received from 2 corresponding satellites based on gross error detections of raw observation measurements and ephemeris validity detections, and thus obtains 18 valid observations and ephemerides to send to the observation function forming module (22).

The observation function forming module (22) may set up observation functions respectively corresponding to the satellites based on the PVT data of the satellites and the predicted PVT results of the receiver (100). For example, the observation function forming module (22) may set up 18 observation functions respectively corresponding to the 18 satellites based on the PVT data of the satellites and the predicted PVT results of the receiver (100). The PVT data of the satellites may include the original observations and the ephemerides obtained from the satellites.

The least square solution module (23) may receive the observation functions, and may calculate first estimated PVT results of the receiver using the observation functions.

The RSIKF (25) may receive the observation functions, may iteratively eliminate fault observation functions from the observation functions in an inner cluster until no fault observation functions being detected in the inner cluster, and may calculate second estimated PVT results of the receiver using the observation functions.

The post-processing module (26 may output final estimated PVT results of the receiver. The final estimated PVT results of the receiver can be either the first estimated PVT results of the receiver using the observation functions calculated by the least square solution module (23) or the second estimated PVT results of the receiver using the observation functions calculated by the RSIKF (25).

Figure 3:
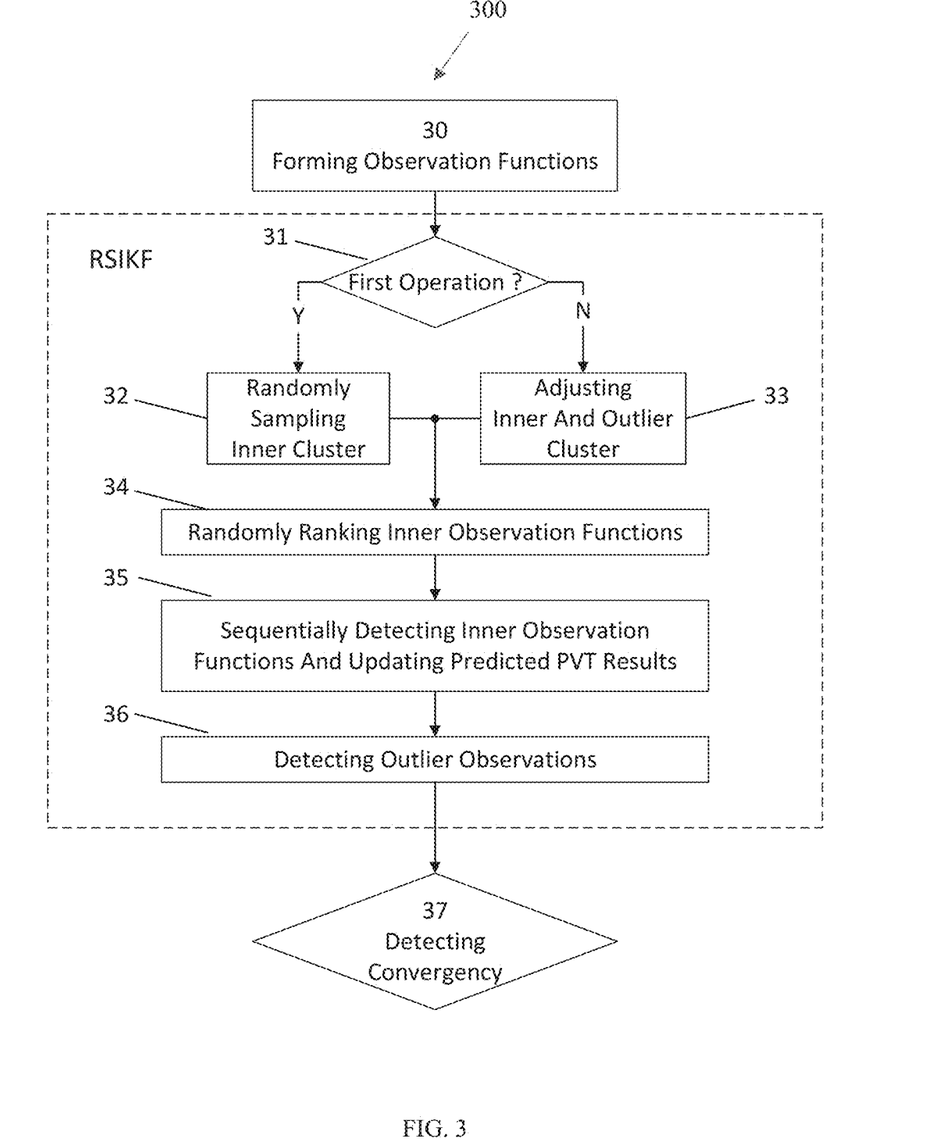
FIG. 3 is a diagram illustrating a Kalman filtering algorithm (300) of calculating PVT results of the receiver (100) using the PVT calculation device (200) according to an embodiment.

FIG. 3 is a diagram illustrating a Kalman filtering algorithm (300) of calculating PVT results of the receiver (100) according to an embodiment. The RSIKF (25) as shown in FIG. 2 may use the Kalman filtering algorithm (300) as shown in FIG. 3 to calculate the PVT results of the receiver (100) in an embodiment. The algorithm (300) may be stored in a storage of the RSIKF (25) in the PVT calculation device (200) in an embodiment. Below explains how the algorithm (300) works to calculate the PVT results of a receiver (100).

In block 30, the observation function forming module (22) may set up observation functions respectively corresponding to the satellites based on the PVT data of the satellites and the predicted PVT results of the receiver (100).

For example, e.g., 18 observation functions may be set up based on e.g., 18 valid observations and e.g., 18 sets of ephemerides received from e.g., 18 satellites, and may be used to calculate the PVT results of a receiver (100).

In block 31, the algorithm (300) checks whether or not the current iteration is the first iteration. If yes, the algorithm goes to block 32, otherwise, if not, the algorithm goes to block 33.

In block 32, the RSIKF (25) randomly samples a first number of observation functions from the observation functions as inner functions into an inner cluster, and puts a second number of observation functions from the observation functions as outlier functions in an outlier cluster. The inner and outlier clusters may be stored in the RSIKF (25).

For example, the RSIKF (25) may randomly sample 10 observation functions from the 18 valid observation functions as inner observation functions in the inner cluster, and puts remaining 8 observation functions as outlier observation functions in the outlier cluster. In this way, the 18 valid observation functions are randomly assigned as 10 inner observation functions and 8 outlier observation functions in block 32.

In block 34, the RSIKF (25) randomly ranks the inner observation functions in the inner cluster in a sequential order. For example, the RSIKF (25) may randomly rank the 10 inner observation functions in the inner cluster in a sequential order.

In block 35, the RSIKF (25) chi-square detects the inner observation functions in the inner cluster one-by-one in the sequential order. If one or more fault inner observation functions are chi-square detected in the inner cluster, the RSIKF (25) will move the one or more fault inner observation functions from the inner cluster to the outlier cluster.

For example, the RSIKF (25) may chi-square detect the 10 inner observation functions in the inner cluster one-by-one in the sequential order. If e.g., 3 fault inner observation functions are chi-square detected in the inner cluster, the RSIKF (25) will move the 3 fault inner observation functions from the inner cluster to the outlier cluster.

Then, in block 35, if a first inner observation function in the inner cluster (e.g., with 10 inner observation functions at start) passes a RSIKF chi-square detection, the first inner observation function will update the predicted PVT results of the receiver to form an updated PVT results of the receiver.

Next, in block 35, if a subsequent (e.g., the second) inner observation function passes the RSIKF chi-square detection, the subsequent inner observation function will update the updated PVT results of the receiver. This process in block 35 goes on one by one with other inner observation functions of the 10 inner observation functions in the inner cluster.

Finally, in block 35, if a last inner observation function (e.g., the tenth) passes the RSIKF chi-square detection, the last inner observation function updates the updated PVT results of the receiver.

In this way, each inner observation function in the inner cluster passing a RSIKF chi-square detection updates the predicted PVT results of the receiver to form a most currently updated PVT results of the receiver.

In block 36, the RSIKF (25) chi-square detects (36) the second number of observation functions in the outlier cluster. If one or more quality outlier observation functions are chi-square detected in the outlier cluster, the RSKKF (25) will move the one or more quality outlier observation functions from the outlier cluster to the inner cluster. For example, if e.g., 2 quality outlier observation functions are chi-square detected in the outlier cluster having 8 outlier observation functions, the RSKKF (25) will move the 2 quality outlier observation functions from the outlier cluster to the inner cluster.

In this way, each quality outlier observation function in the outlier cluster passing a RSIKF chi-square detection is moved from the outlier cluster to the inner cluster.

In block 37, at the end of the current iteration, upon detecting at least one observation function moving between the inner and outlier clusters in the current iteration, a RSIKF convergence detection is set false. Otherwise, upon detecting no functions moving between the inner and outlier clusters in the current iteration, the RSIKF convergence detection is set true. After that, the current iteration is done.

For example, in the current iteration, since 3 fault inner observation functions are detected moving from the inner cluster to the outlier cluster, as well as 2 quality outlier observation functions are detected moving from the outlier cluster to the inner cluster, the RSIKF convergence detection is set false.

As long as the RSIKF convergence detection is false, the Kalman filtering algorithm (300) will continue to run a subsequent iteration starting from block 31 again. The subsequent iteration is described as follows.

In block 31, the algorithm (300) checks that the subsequent iteration is not the first (or initial) iteration, and thus goes to block 33.

In block 33, the RSIKF (25) adjusts the inner and the outlier clusters for the subsequent iteration.

In block 34, the RSIKF (25) randomly ranks the adjusted inner observation functions in the adjusted inner cluster (34) in the sequential order in the subsequent iteration. For example, the RSIKF randomly ranks the 9 adjusted inner observation functions in the adjusted inner cluster in the sequential order in the subsequent iteration.

In block 35, the RSIKF (25) sequentially chi-square detects the adjusted inner observation functions (e.g., the 9 adjusted inner observation functions) in the adjusted inner cluster in the sequential order in the subsequent iteration.

The operations performed in the block 35 with respect to the subsequent iteration are the same as those performed in the block 35 as described with respect to the first iteration.

For example, in block 35, a first inner observation function passing the RSIKF chi-square detection updates the predicted PVT results of the receiver from the pre-processing module (21) to form an updated PVT results of the receiver in the subsequent iteration. Next, in block 35, a subsequent inner observation function passing the RSIKF chi-square detection updates the updated PVT results of the receiver in the subsequent iteration. Finally, in block 35, a last inner observation function passing the RSIKF chi-square detection finally updates the updated PVT results of the receiver in the subsequent iteration.

In block 36, the RSIKF chi-square detects the outlier observation functions in the outlier cluster to find one or more quality outlier observations to move to the inner cluster in the subsequent iteration.

In block 37, based on whether at least a moving function is found moving between the inner and the outlier clusters in the subsequent iteration, the RSIKF convergence detection is set false or true in the subsequent iteration. If the RSIKF convergence detection is detected false in the subsequent iteration, another subsequent iteration will carry out, until the RSIKF convergence detection is detected true.

In an embodiment, responsive to the RSIKF convergence detection being true, the RSIKF (25) outputs the updated PVT results of the receiver, which is calculated by the RSIKF (25) as the final estimated PVT results of the receiver. In this way, improved positioning results of the receiver with increased accuracy and robustness can be calculated by the RSIKF.

In an embodiment, responsive to the RSIKF convergence detection being false after a limited number of iterations (e.g., 20 times), the post-processing module (26) outputs the first estimated PVT results of the receiver, which is calculated by the least square solution module (23), as the final estimated PVT results of the receiver. In this way, the first estimated PVT results of the receiver calculated by the least square solution module (23) can be used as a backup, when the second estimated PVT results of the receiver calculated by the RSIKF (25) is unavailable due to the final false result of the RSIKF convergence detection.

The Kalman filtering algorithm (300), a random sampling iterative filtering algorithm, may randomly sample the observation functions into the inner cluster at the beginning, may randomly rank the inner observation functions in the inner cluster in each iteration, may iteratively eliminate fault inner observation functions from the inner cluster in each iteration, and may keep on updating the predicted PVT results of the receiver obtained from the pre-processing module by each inner observation function passing the RSIKF chi-square detection in each iteration. Thus, the Kalman filtering algorithm (300) can improve the accuracy and stability of the PVT results of the receiver, especially when the receiver is located on a patch that is significantly affected by multiple delays, for example, caused by urban high-rises, overpasses, and canyons. A course of a vehicle carrying the GNSS receiver (100) can be changed based on the final estimated PVT results of the receiver.

Figure 4:
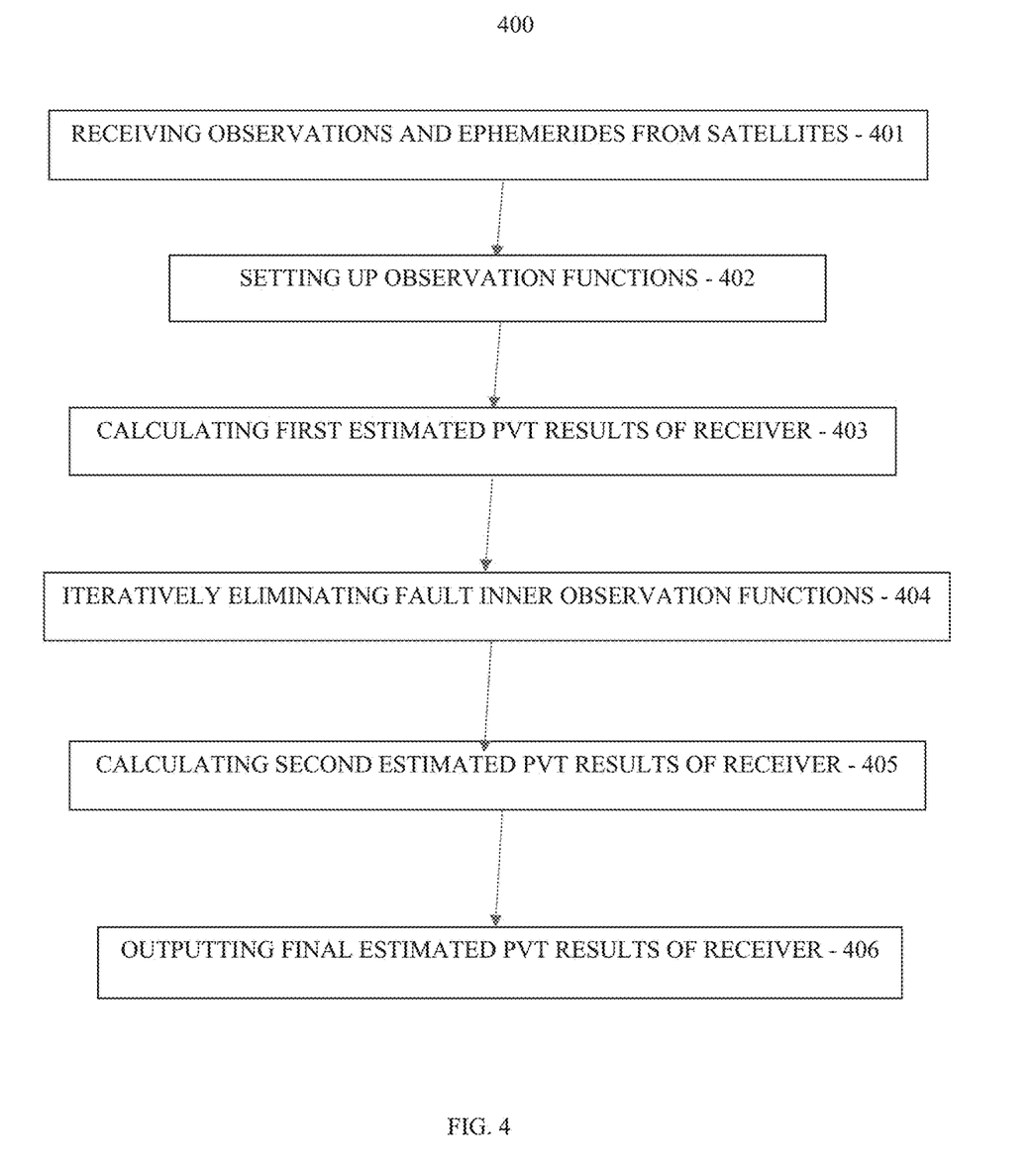
FIG. 4 is a diagram illustrating a method (400) of calculating PVT results of the receiver (100) using the PVT calculation device (200) according to an embodiment.

FIG. 4 is a diagram illustrating a method (400) of calculating PVT results of a receiver (100) using a PVT calculation device (200) according to an embodiment. As shown in FIG. 2, the PVT calculation device (200) may include a pre-processing module (21), an observation function forming module (22) coupled to the pre-processing module (21), a least square solution module (23) coupled to a first convergence detector (24) and the observation function forming module (22), a RSIKF (25) coupled to a second convergence detector (27) and the observation function forming module (22), and a post-processing module (26) coupled to the least square solution module (23) and the RSIKF (25).

The method (400) of calculating PVT results of a receiver (100) using a PVT calculation device (200) according to an embodiment is described as follows.

In block 401, receiving, by a pre-processing module (21), observations and ephemerides from satellites, to obtain PVT data of the satellites and predicted PVT results of the receiver (401).

In block 402, setting up, by the observation function forming module (22), observation functions respectively corresponding to the satellites, based on the PVT data of the satellites and the predicted PVT results of the receiver (402).

In block 403, calculating, by the least square solution module (23), first estimated PVT results of the receiver based on the observation functions (403).

In block 404, iteratively eliminating, by the RSIKF (25), fault observation functions from the observation functions in an inner cluster until no fault observation functions detected in the inner cluster (404).

In block 405, calculating, by the RSIKF (25), second estimated PVT results of the receiver using the observation functions in the inner cluster (405).

In block 406, outputting, by the post-processing module (26), final estimated PVT results of the receiver (406).

In an embodiment, in a first iteration (31), the RSIKF (25) randomly samples a first number of observation functions into the inner cluster (32), and puts a remaining second number of observation functions in an outlier cluster.

In the first iteration, the RSIKF (25) randomly ranks inner observation functions in the inner cluster (34) in a sequential order.

In the first iteration, the RSIKF (25) sequentially chi-square detects (35) the inner observation functions in the inner cluster in the sequential order, and upon detecting one or more fault inner observation functions in the inner cluster, the RSIKF (25) moves the one or more fault inner observation functions from the inner cluster to the outlier cluster.

In the first iteration, the RSIKF (25) chi-square detects (36) the second number of observation functions in the outlier cluster, and upon detecting at least a quality outlier observation function in the outlier cluster, the RSIKF (25) moves the at least quality outlier observation function from the outlier cluster to the inner cluster.

How the RSIKF (25) calculates the second estimated PVT results of the receiver is further explained with respect to FIGS. 3 and 4. In the first iteration, responsive to detecting a first inner observation function passing a RSIKF chi-square detection, the first inner observation function updates (35) the predicted PVT results of the receiver to form an updated PVT results of the receiver. Next, responsive to detecting a subsequent inner observation function passing the RSIKF chi-square detection, the subsequent inner observation function updates (35) the updated PVT results of the receiver. Finally, responsive to detecting a last inner observation function passing the RSIKF chi-square detection, the last inner observation function updates (35) the updated PVT results of the receiver.

In an embodiment, upon at least one function of the observation functions being found moving between the inner and outlier clusters in a current iteration in the first iteration, a RSIKF convergence detection is set false (37), and upon no functions being found moving between the inner and outlier clusters in the first iteration, the RSIKF convergence detection is set true.

In case that the RSIKF convergence detection is detected false, the subsequent iteration will continue. In the subsequent iteration, the RSIKF first adjusts the inner cluster and the outlier cluster. Subsequently, the RSIKF randomly ranks the inner observation functions in the adjusted inner cluster in a sequential order. Next, RSIKF sequentially chi-square detects the inner observation functions in the adjusted inner cluster in the sequential order. Upon detecting one or more fault inner observation functions in the adjusted inner cluster, the RSIKF moves the one or more fault inner observation functions from the adjusted inner cluster to the adjusted outlier cluster.

In the subsequent iteration, a further first inner observation functions passing the chi-square detecting by the RSIKF updates the predicted PVT results of the receiver obtained from the pre-processing module (21) to form a further updated PVT results of the receiver. Next, a further subsequent inner observation function passing the chi-square detecting by the RSIKF updates the further updated PVT results of the receiver. Finally, a further last inner observation function passing the chi-square detecting by the RSIKF updates the further updated PVT results of the receiver.

In the subsequent iteration, the RSIKF chi-square detects the outlier observation functions in the adjusted outlier cluster. Upon detecting at least one quality outlier observation function in the adjusted outlier cluster, the RSIKF moves the at least quality outlier observation function from the adjusted outlier cluster to the adjusted inner cluster.

In the subsequent iteration, whether to continue to perform another subsequent iteration depends on whether at least an observation function is found moving between the adjusted inner and outlier clusters. Iterations will continue until no observation functions are found moving between the adjusted inner and outlier clusters.

Upon finding no observation functions moving between the adjusted inner and outlier clusters in the subsequent iteration, the updated PVT results of the receiver are output to the outside by the post-processing module (26) as the final estimated PVT results of the receiver. Upon finding at least one observation functions moving between the adjusted inner and outlier clusters in the subsequent iteration, a further subsequent iteration will carry out.

In an embodiment, upon finding at least one observation function moving between the adjusted inner and outlier clusters after a limited number of iterations (for example, 30 times), the first estimated PVT results of the receiver are output by the post-processing module (26) as the final estimated PVT results of the receiver to outside.

Figure 5:
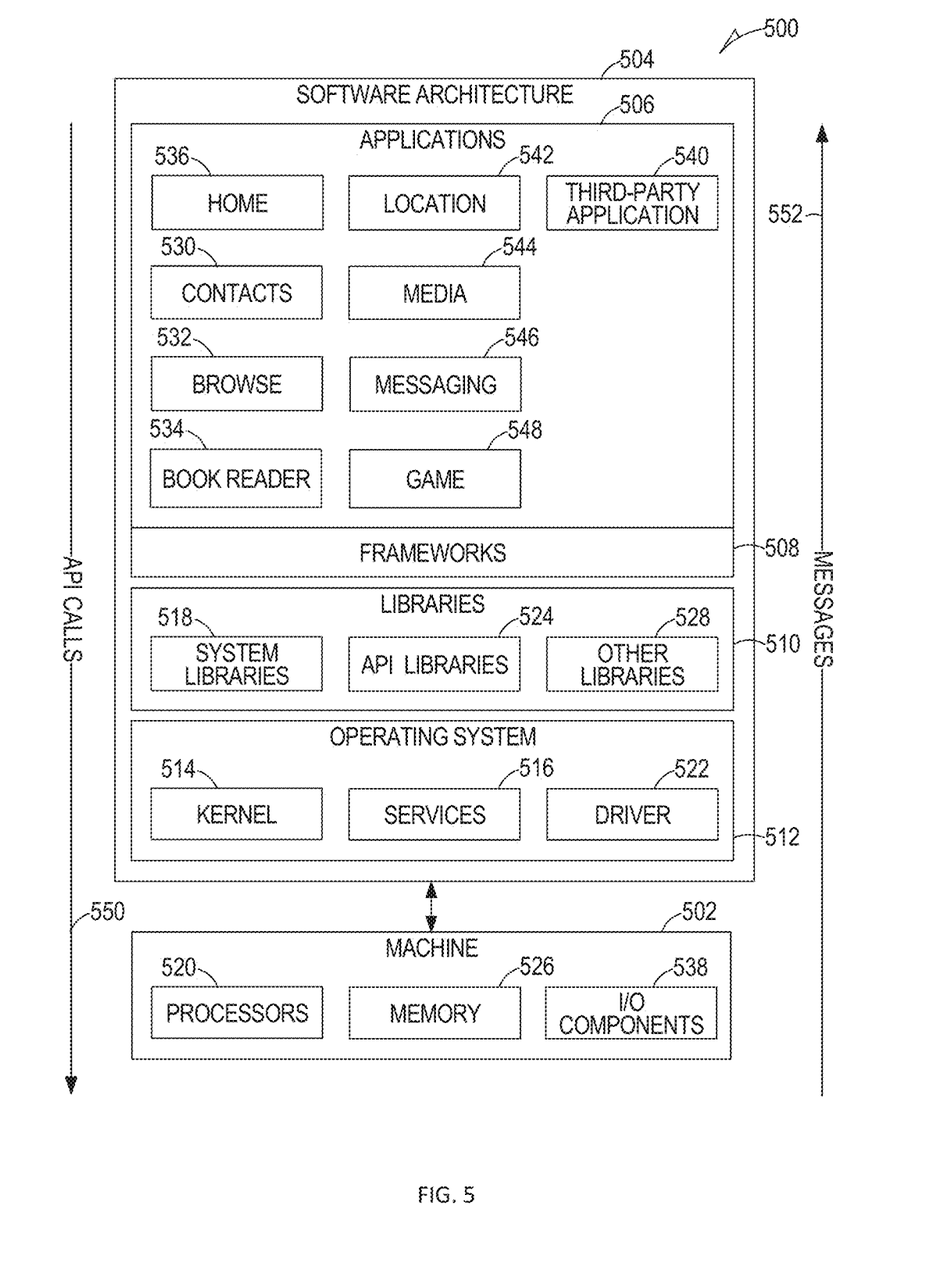
FIG. 5 is a block diagram showing a software architecture (500) within which examples may be implemented.

FIG. 5 is a block diagram 500 illustrating a software architecture 504, which can be installed on any one or more of the wireless smart devices (such as a smart socket) described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A Position-Velocity-Time (PVT) calculation device (200) in a Global Navigation Satellite System (GNSS) receiver (100), comprising:
   a memory; and
   one or more processors in communication with the memory, the one or more processors configured to perform operations including:
   receiving observations and ephemerides from satellites to obtain PVT data of the satellites and predicted PVT results of the receiver;
   setting up observation functions respectively corresponding to the satellites, based on the PVT data of the satellites and the predicted PVT results of the receiver;
   calculating by a least square solution first estimated PVT results of the receiver based on the observation functions;
   iteratively eliminating, by a Random-Sampling Iterative Kalman Filter (RSIKF) algorithm, fault observation functions from the observation functions in an inner cluster until no fault observation functions detected in the inner cluster;
   calculating, by the RSIKF algorithm, second estimated PVT results of the receiver using the observation functions in the inner cluster; and
   outputting final estimated PVT results of the receiver.

2. The PVT calculation device of claim 1, wherein the iteratively eliminating fault functions from the observation functions comprises:
   in a first iteration (31), randomly sampling (32) a first number of observation functions into the inner cluster, and putting a remaining second number of observation functions in an outlier cluster;
   in the first iteration, randomly ranking (34) inner observation functions in the inner cluster in a sequential order;
   in the first iteration, sequentially chi-square detecting (35) the inner observation functions in the inner cluster in the sequential order, wherein upon detecting one or more fault inner observation functions in the inner cluster, the one or more fault inner observation functions are moved from the inner cluster to the outlier cluster; and
   in the first iteration, chi-square detecting the second number of observation functions in the outlier cluster (36), wherein upon detecting at least a quality outlier observation function in the outlier cluster, the at least quality outlier observation function are moved from the outlier cluster to the inner cluster.

3. The PVT calculation device of claim 2, wherein the calculating the second estimated PVT results of the receiver using the remaining observation functions comprises:
   in the first iteration, responsive to detecting a first inner observation function passing a RSIKF chi-square detection, updating by the first inner observation function the predicted PVT results of the receiver to form an updated PVT results of the receiver, in the first iteration, responsive to detecting a subsequent inner observation function passing the RSIKF chi-square detection, updating by the subsequent inner observation function the updated PVT results of the receiver, and in the first iteration, responsive to detecting a last inner observation function passing the RSIKF chi-square detection, updating by the last inner observation function the updated PVT results of the receiver.

4. The PVT calculation device of claim 3, wherein upon at least one function of the observation functions being found moving between the inner and outlier clusters in a current iteration in the first iteration, a RSIKF convergence detection is set false, and wherein upon no functions being found moving between the inner and outlier clusters in the first iteration, the RSIKF convergence detection is set true.

5. The PVT calculation device of claim 4, further comprising:

in a subsequent iteration, if the RSIKF convergence detection is set false after the first iteration, adjusting (33) the inner cluster and the outlier cluster;

in the subsequent iteration, randomly ranking (34) by the RSIKF algorithm the inner observation functions in the adjusted inner cluster in a sequential order;

in the subsequent iteration, sequentially chi-square detecting (35) by the RSIKF algorithm the inner observation functions in the adjusted inner cluster in the sequential order, wherein a further first inner observation functions passing the chi-square detecting by the RSIKF algorithm updates the predicted PVT results of the receiver to form a further updated PVT results of the receiver, wherein a further subsequent inner observation function passing the chi-square detecting by the RSIKF algorithm updates the further updated PVT results of the receiver, and wherein a further last inner observation function passing the chi-square detecting by the RSIKF algorithm updates the further updated PVT results of the receiver;

in the subsequent iteration, upon detecting one or more fault inner observation functions in the adjusted inner cluster, moving the one or more fault inner observation functions from the adjusted inner cluster to the adjusted outlier cluster;

in the subsequent iteration, chi-square detecting (36) the outlier observation functions in the adjusted outlier cluster, wherein upon detecting at least a quality outlier observation function in the adjusted outlier cluster, the at least quality outlier observation function is moved from the adjusted outlier cluster to the adjusted inner cluster; and in the subsequent iteration, determining whether to continue to another subsequent iteration based on whether at least an observation function is found moving between the adjusted inner and outlier clusters, wherein iterations continues until no observation functions are found moving between the adjusted inner and outlier clusters.

6. The PVT calculation device of claim 5, wherein upon finding no observation functions moving between the adjusted inner and outlier clusters in the subsequent iteration, the updated PVT results of the receiver are output as the final estimated PVT results of the receiver to outside, and wherein upon finding at least one observation functions moving between the adjusted inner and outlier clusters in the subsequent iteration, a further subsequent iteration carries out.

7. The PVT calculation device of claim 6, wherein upon finding at least one observation function moving between the adjusted inner and outlier clusters after a limited number of iterations, the first estimated PVT results of the receiver are output as the final estimated PVT results of the receiver to outside.

8. A computer-implemented method (400) of calculating Position-Velocity-Time (PVT) results of a receiver (100) using a PVT calculation device (200), the method comprising:

receiving observations and ephemerides from satellites to obtain PVT data of the satellites and predicted PVT results of the receiver;

setting up observation functions respectively corresponding to the satellites, based on the PVT data of the satellites and the predicted PVT results of the receiver;

calculating, by a least square solution, first estimated PVT results of the receiver based on the observation functions;

iteratively eliminating, by a Random-Sampling Iterative Kalman Filter (RSIKF) algorithm, fault observation functions from the observation functions in an inner cluster until no fault observation functions detected in the inner cluster;

calculating, by the RSIKF algorithm, second estimated PVT results of the receiver using the observation functions in the inner cluster; and outputting final estimated PVT results of the receiver.

9. The computer-implemented method of claim 8, wherein the iteratively eliminating fault functions by the RSIKF algorithm from the observation functions comprises:

in a first iteration (31), randomly sampling (32) a first number of observation functions into the inner cluster, and putting a remaining second number of observation functions in an outlier cluster;

in the first iteration, randomly ranking (34) inner observation functions in the inner cluster in a sequential order;

in the first iteration, sequentially chi-square detecting (35) the inner observation functions in the inner cluster in the sequential order, wherein upon detecting one or more fault inner observation functions in the inner cluster, the one or more fault inner observation functions are moved from the inner cluster to the outlier cluster; and in the first iteration, chi-square detecting the second number of observation functions in the outlier cluster (36), wherein upon detecting at least a quality outlier observation function in the outlier cluster, the at least quality outlier observation function is moved from the outlier cluster to the inner cluster.

10. The computer-implemented method of claim 9, wherein the calculating by the RSIKF algorithm the second estimated PVT results of the receiver using the remaining observation functions comprises:

in the first iteration, responsive to detecting a first inner observation function passing a RSIKF chi-square detection, updating by the first inner observation function the predicted PVT results of the receiver to form an updated PVT results of the receiver, in the first iteration, responsive to detecting a subsequent inner observation function passing the RSIKF chi-square detection, updating by the subsequent inner observation function the updated PVT results of the receiver, and in the first iteration, responsive to detecting a last inner observation function passing the RSIKF chi-square detection, updating by the last inner observation function the updated PVT results of the receiver.

11. The computer-implemented method of claim 10, wherein upon at least one function of the observation functions being found moving between the inner and outlier clusters in a current iteration in the first iteration, a RSIKF convergence detection is set false, and wherein upon no functions being found moving between the inner and outlier clusters in the first iteration, the RSIKF convergence detection is set true.

12. The computer-implemented method of claim 11, further comprising:

in a subsequent iteration, if the RSIKF convergence detection is set false after the first iteration, adjusting (33) by the RSIKF the inner cluster and the outlier cluster;

in the subsequent iteration, randomly ranking (34) by the RSIKF algorithm the inner observation functions in the adjusted inner cluster in a sequential order;

in the subsequent iteration, sequentially chi-square detecting (35) by the RSIKF algorithm the inner observation functions in the adjusted inner cluster in the sequential order, wherein upon detecting one or more fault inner observation functions in the adjusted inner cluster, the one or more fault inner observation functions are moved from the adjusted inner cluster to the adjusted outlier cluster, wherein a further first inner observation functions passing the chi-square detecting by the RSIKF algorithm updates the predicted PVT results of the receiver to form a further updated PVT results of the receiver, wherein a further subsequent inner observation function passing the chi-square detecting by the RSIKF algorithm updates the further updated PVT results of the receiver, and wherein a further last inner observation function passing the chi-square detecting by the RSIKF algorithm updates the further updated PVT results of the receiver;

in the subsequent iteration, chi-square detecting (36) by the RSIKF algorithm the outlier observation functions in the adjusted outlier cluster, wherein upon detecting at least a quality outlier observation function in the adjusted outlier cluster, the at least quality outlier observation function is moved from the adjusted outlier cluster to the adjusted inner cluster; and in the subsequent iteration, determining whether to continue to another subsequent iteration based on whether at least an observation function is found moving between the adjusted inner and outlier clusters, wherein iterations continues until no observation functions are found moving between the adjusted inner and outlier clusters.

13. The computer-implemented method of claim 12, wherein upon finding no observation functions moving between the adjusted inner and outlier clusters in the subsequent iteration, the updated PVT results of the receiver are output as the final estimated PVT results of the receiver to outside, and wherein upon finding at least one observation functions moving between the adjusted inner and outlier clusters in the subsequent iteration, a further subsequent iteration carries out.

14. The computer-implemented method of claim 13, wherein upon finding at least one observation function moving between the adjusted inner and outlier clusters after a limited number of iterations, the first estimated PVT results of the receiver are output as the final estimated PVT results of the receiver to outside.

15. A non-transitory computer-readable medium storing instructions that, when executed by one or more computer processors of a Position-Velocity-Time (PVT) calculation device (200) in a Global Navigation Satellite System (GNSS) receiver (100), cause the PVT calculation device to perform operations comprising:

receiving observations and ephemerides from satellites to obtain PVT data of the satellites and predicted PVT results of the receiver;

setting up observation functions respectively corresponding to the satellites, based on the PVT data of the satellites and the predicted PVT results of the receiver;

calculating by a least square solution first estimated PVT results of the receiver based on the observation functions;

iteratively eliminating by a Random-Sampling Iterative Kalman Filter (RSIKF) algorithm fault observation functions from the observation functions in an inner cluster until no fault observation functions detected in the inner cluster;

calculating by the RSIKF algorithm a second estimated PVT results of the receiver using the observation functions in the inner cluster; and outputting final estimated PVT results of the receiver.

16. The non-transitory computer-readable medium of claim 15, wherein a course of a vehicle carrying the GNSS receiver is changed based on the final estimated PVT results of the receiver.

17. The non-transitory computer-readable medium of claim 15, wherein the iteratively eliminating fault functions by the RSIKF algorithm from the observation functions comprises:

in a first iteration (31), randomly sampling (32) a first number of observation functions into the inner cluster, and putting a remaining second number of observation functions in an outlier cluster;

in the first iteration, randomly ranking (34) inner observation functions in the inner cluster in a sequential order;

in the first iteration, sequentially chi-square detecting (35) the inner observation functions in the inner cluster in the sequential order, wherein upon detecting one or more fault inner observation functions in the inner cluster, the one or more fault inner observation functions are moved from the inner cluster to the outlier cluster; and in the first iteration, chi-square detecting the second number of observation functions in the outlier cluster (36), wherein upon detecting at least a quality outlier observation function in the outlier cluster, the at least quality outlier observation function is moved from the outlier cluster to the inner cluster.

18. The non-transitory computer-readable medium of claim 17, wherein the calculating by the RSIKF algorithm the second estimated PVT results of the receiver using the remaining observation functions comprises:

in the first iteration, responsive to detecting a first inner observation function passing a RSIKF chi-square detection, updating by the first inner observation function the predicted PVT results of the receiver to form an updated PVT results of the receiver, in the first iteration, responsive to detecting a subsequent inner observation function passing the RSIKF chi-square detection, updating by the subsequent inner observation function the updated PVT results of the receiver, and in the first iteration, responsive to detecting a last inner observation function passing the RSIKF chi-square detection, updating by the last inner observation function the updated PVT results of the receiver.

19. The non-transitory computer-readable medium of claim 18, wherein the operations further comprise:

in a subsequent iteration, if a RSIKF convergence detection is set false after the first iteration, adjusting (33) by the RSIKF algorithm the inner cluster and the outlier cluster;

in the subsequent iteration, randomly ranking (34) by the RSIKF algorithm the inner observation functions in the adjusted inner cluster in a sequential order;

in the subsequent iteration, sequentially chi-square detecting (35) by the RSIKF algorithm the inner observation functions in the adjusted inner cluster in the sequential order, wherein upon detecting one or more fault inner observation functions in the adjusted inner cluster, the one or more fault inner observation functions are moved from the adjusted inner cluster to the adjusted outlier cluster, wherein a further first inner observation functions passing the chi-square detecting by the RSIKF algorithm updates the predicted PVT results of the receiver to form a further updated PVT results of the receiver, wherein a further subsequent inner observation function passing the chi-square detecting by the RSIKF algorithm updates the further updated PVT results of the receiver, and wherein a further last inner observation function passing the chi-square detecting by the RSIKF algorithm updates the further updated PVT results of the receiver;

in the subsequent iteration, chi-square detecting (36) by the RSIKF algorithm the outlier observation functions in the adjusted outlier cluster, wherein upon detecting at least a quality outlier observation function in the adjusted outlier cluster, the at least quality outlier observation function is moved from the adjusted outlier cluster to the adjusted inner cluster; and in the subsequent iteration, determining whether to continue to another subsequent iteration based on whether at least an observation function is found moving between the adjusted inner and outlier clusters, wherein iterations continues until no observation functions are found moving between the adjusted inner and outlier clusters.

20. The non-transitory computer-readable medium of claim 19, wherein upon finding no observation functions moving between the adjusted inner and outlier clusters in the subsequent iteration, the updated PVT results of the receiver are output as the final estimated PVT results of the receiver to outside, and wherein upon finding at least one observation functions moving between the adjusted inner and outlier clusters in the subsequent iteration, a further subsequent iteration carries out.

* * * * *